3,479,396
SUBSTITUTED ARYLACETOHYDROXAMIC ACIDS

Nguyen P. Buu-Hoi, Hue, Vietnam, and Georges Lambelin, Constan Lepoivre, Claude Gillet, and Jacques Thiriaux, Brussels, Belgium, assignors to Madan AD., Chur, Switzerland, a company of Switzerland
No Drawing. Continuation-in-part of application Ser. No. 458,396, May 24, 1965. This application Aug. 12, 1968, Ser. No. 751,710
Claims priority, application Belgium, June 5, 1964, 648,892; Mar. 17, 1965, 661,226
Int. Cl. C07c 103/30; A61k 27/00
U.S. Cl. 260—500.5     5 Claims

ABSTRACT OF THE DISCLOSURE

A new group of substituted arylacetohydroxamic acids are prepared by reacting with hydroxylamine and alkyl aryl acetate of the formula:

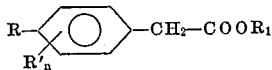

wherein R and R′ represent an alkyl $C_1$–$C_8$, cycloalkyl $C_5$–$C_6$, alkyloxy $C_1$–$C_8$, alkenyloxy $C_2$–$C_8$, cycloalkenyloxy $C_5$–$C_6$, alkylthio $C_1$–$C_8$, cycloalkyloxy $C_5$–$C_6$, cycloalkylalkyloxy (with cycloalkyl $C_5$–$C_6$ and alkyl $C_1$–$C_8$), or arylalkyloxy $C_1$–$C_8$, R and R′ being the same or different, R′ can also represent hydrogen, and $n$ is an integer of 0 to 2, and $R_1$ represents an alkyl radical. These new compounds, represented by the formula:

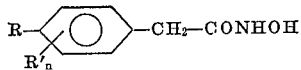

wherein R, R′ and $n$ are as defined above, possess an interesting combination of antipyretic, anti-inflammatory, antispasmodic and analgesic properties indicating therapeutic application in rheumatoid conditions. They are also useful as antihystaminics and antiserotonics and are cortico-stimulating.

---

This application is a continuation-in-part of our copending application Ser. No. 458,396, filed May 24, 1965, and now abandoned.

This invention relates to use in pharmaceutical field of new substituted arylacetohydroxamic acids.

At the present time, a substantial proportion of pharmacological research on the cure or mitigation of rheumatoid conditions is directed to the synthesis of new non-steroid compounds having strong anti-inflammatory activity.

As explained below, the new substituted arylacetohydroxamic acids of the invention have an anti-inflammatory (anti-phlogistic), analgesic, antipyretic and antispasmodic activity with other desirable subsidiary activities more-or-less related thereto.

The new substituted arylacetohydroxamic acids of the invention are represented by the following general formula:

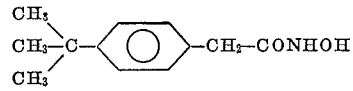

wherein R and R′ represent an alkyl $C_1$–$C_8$, cycloalkyl $C_5$–$C_6$, alkyloxy $C_1$–$C_8$, alkenyloxy $C_2$–$C_8$, cycloalkenyloxy $C_5$–$C_6$, alkylthio $C_1$–$C_8$, cycloalkyloxy $C_5$–$C_6$, cycloalkylalkyloxy (with cycloalkyl $C_5$–$C_6$ and alkyl $C_1$–$C_8$), or arylalkyloxy $C_1$–$C_8$, R and R′ being the same or different, R′ can also represent hydrogen, and $n$ is an integer of 0 to 2.

As general process for preparing compounds of Formula I, an alkyl arylacetate having the formula:

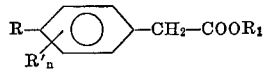

wherein R, R′ and $n$ have the same meaning as above and $R_1$ represents an alkyl radical is reacted with hydroxylamine so as to obtain the corresponding arylacetohydroxamic acid.

The starting alkyl arylacetate may be produced by treating with sulphur and a secondary base, such as morpholine, an acetophenone duly substituted in R and R′, hydrolyzing the resulting complex so as to obtain the corresponding arylacetic acid which is esterified to yield the desired arylacetate.

The starting alkyl arylacetate may also be obtained by condensing a p-alkyl-, p-cycloalkyl-, p-alkyloxy-, p-alkenyloxy-, p-alkylthio-, p-cycloalkyloxy-, p-cycloalkylalkyloxy-, or arylalkyloxybenzyl halide with an alkaline cyanide, thereby producing an arylacetonitrile which is treated with an acid and an alcohol yielding the desired ester.

According to the latter procedure, for example, a p-alkylbenzyl chloride is condensed with an alkaline cyanide so as to obtain the corresponding p-alkylphenylacetonitrile; the latter, upon treatment with sulfuric acid and an alcohol, is converted to the corresponding p-alkylphenylacetate which is reacted in the crude state with hydroylamine to produce the corresponding phenylacetohydroxamic acid.

By the same process starting with the appropriate substituted benzyl halides, all the arylacetohydroxamic acids of Formula I may be readily prepared.

This procedure is set forth in detail in the following example for the preparation of p-tert-butylphenylacetohydroxamic acid.

EXAMPLE 1

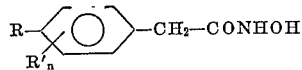

(a) To a solution of 15.5 g. of NaCN is 15 cc. of water, a solution of 45 g. of p-tertiary butylbenzyl chloride [boiling point (3 mm./Hg): 88–89° C.; obtained by chloromethylation of tertiary butylbenzene] in 45 cc. of ethanol is added for a period of 30 minutes.

This mixture is refluxed for 4 hours, then cooled; the inorganic precipitate is filtered off and washed with a small amount of alcohol. The filtrate is then distilled to remove the alcohol, the residue is taken up in ether, washed with water and then dried on magnesium sulfate. After evaporation of the ether solvent, the residue is distilled under reduced pressure and the p-tertiary butylphenylacetonitrile, boiling point (16 mm.): 149–152° C. is collected.

(b) 20 g. (25 ml.) of methanol and 20 g. (10.9 ml.) of concentrated sulfuric acid are mixed with stirring and cooling. 17.3 g. of the p-tertiary butylphenylacetonitrile are then added and the whole is refluxed for 10 hours. The reaction mixture is cooled and poured in a water-ice mixture. The organic layer is separated, dried on MgSO₄ and the methanol distilled off. Methyl p-tertiary butylphenylacetate (which is not isolated) is obtained in the crude state.

(c) Separately, 5 g. of Na are dissolved in 150 ml. of absolute methanol and 7 g. of NH₂—OH—HCl in 100 ml. of absolute methanol. The two solutions are mixed and the precipitate of NaCl which is formed is filtered.

To this filtrate the crude methyl p-tertiary butylphenylacetate is added followed by refluxing for 1 hour.

After cooling, the mixture is acidified with 20% HCl and the resulting precipitate of p-tertiary butylphenylacetohydroxamic acid is collected. Upon recrystallization from acetone a white product having a melting point of 115–118° is obtained. The product dissolved in methanol gives a wine-red color when ferric chloride (test for hydroxamic acids).

*Analysis.*—Percent found: C, 69.2; H, 8.4; N, 6.68. Percent calculated: C, 69.5; H, 8.21; N, 6.76.

By using the same procedure from the corresponding alkylbenzene, one obtains:

p-n-butylphenylacetohydroxamic acid—M.P.: 149–151° C.
p-n-amylphenylacetohydroxamic acid—M.P.: 143–150° C.
p-isobutylphenylacetohydroxamic acid—M.P.: 145–146° C.
p-isoamylphenylacetohydroxamic acid—M.P.: 152° C.
p-isopropylphenylacetohydroxamic acid—M.P.: 138–141° C.
p-n-propylphenylacetohydroxamic acid—M.P.: 140° C.
p-tert-amylphenylacetohydroxamic acid
p-cyclohexylphenylacetohydroxamic acid As explained before, it is also possible to obtain starting alkyl arylacetate by starting from a substituted acetophenone which is treated with sulfur and a secondary base, such as morpholine, so as to obtain a complex which is hydrolyzed so as to give the corresponding arylacetic acid which is esterified to obtain the starting alkyl arylacetate. The latter is then treated with hydroxylamine in a suitable solvent to obtain the substituted arylacetohydroxamic acid.

The starting substituted acetophenone may be obtained by condensing p-hydroxyacetophenone with an alkyl halide, such as alkyl bromide. Also, said substituted acetophenone can be obtained from phenol which is condensed with an alkyl halide, such as alkyl bromide, so as to give alkyloxybenzene which is treated with acetic anhydride in the presence of an acid catalyst of Lewis (for example a metal chloride, polyphosphoric acid or boron fluoride) so as to give the desired substituted acetophenone.

The complete preparation of a hydroxamic acid according to the invention by this latter method starting with a substituted acetophenone is described in the following examples.

EXAMPLE 2 p-n-Butyloxyphenylacetohydroxamic acid

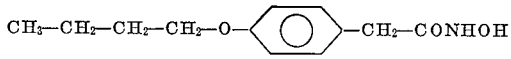

(1) 136 g. of p-hydroxyacetophenone, 140 g. of butyl bromide, 152 g. of potassium carbonate, 17 g. of potassium iodide and 275 cc. of ethanol are mixed and then refluxed for 48 hours. The reaction mixture is cooled, diluted with water, then extracted with ether. The ethereal phase is washed with a 10% sodium hydroxide solution, then with water, followed by drying, ether is evaporated and the product is distilled under reduced pressure. 168 g. of p-butyloxyacetophenone are obtained with yield of 87% (160–162° C. at 11 mm. Hg).

(2) 192 g. of p-butyloxyacetophenone, 42 g. of sulfur and 130 g. of morpholine are mixed and then refluxed for 14 hours. The resulting solution is poured into water and stirred until crystallization of the sulfurated complex. The latter is filtered, washed with water and dried. Production: 270 g. (yield of 88%).

(3) 200 g. of sodium hydroxide are dissolved in 1500 cc. of ethanol and then 293 g. of the thus-obtained sulfurated complex are added. The mixture is refluxed overnight. The mixture is distilled to separate the maximum of the alcohol and then diluted with water. The resulting solution is acidified with hydrochloric acid, and extracted with ether. The ethereal phase is washed with water, followed by extraction with a 10% sodium carbonate solution. The carbonated solution is acidified with 10% hydrochloric acid, and the resulting precipitate of p-n-butyloxyphenylacetic acid is filtered and dried. 100 g. of this product are obtained (yield of 70%).

(4) 208 g. of p-n-butyloxyphenylacetic acid, 368 g. of ethanol and 18 cc. of sulfuric acid are refluxed for 5 hours. The mixture is diluted with water, after which it is extracted with ether. The ethereal phase is successively washed with water, then with carbonate, and again with water, following which it is dried and distilled to remove solvent. The ester is then distilled at a reduced pressure. 200 g. of ethyl p-butyloxyphenylacetate are thus obtained with yield of 61% (186° C. at 8 mm. Hg).

(5) 7 g. of hydroxylamine hydrochloride are dissolved in 100 cc. of methanol. A solution of 5 g. of sodium in 150 cc. of methanol is added and the salt precipitate is separated by filtration. 22 g. of ethyl p-n-butyloxyphenylacetate are added to the filtrate and the mixture is refluxed for 1 hour. The mixture is cooled and acidified with 20% hydrochloric acid. 14.7 g. of p-n-butyloxyphenylacetohydroxamic acid are thus obtained with yield of 71% (M.P.: 153–155°).

Other examples of preparation of acids according to the invention are given hereinafter, only the reaction between the ester and hydroxylamine being described, in order to avoid unnecessary duplication.

EXAMPLE 3 p-Cyclopentyloxyphenylacetohydroxamic acid 134 g. of ethyl p-cyclopentyloxyphenylacetate are treated with a solution of 27 g. of sodium in 810 cc. of methanol, mixed with a solution of 33 g. hydroxylamine hydrochloride in 540 cc. of methanol, then one refluxes for 1 hour. After acidification with 20% hydrochloric acid, 87 g. of p-cyclopentyloxyphenylacetohydroxamic acid are obtained with yield of 71% (M.P.: 122–124°).

EXAMPLE 4 p-Phenylethyloxyphenylacetohydroxamic acid 43 g. of p-phenylethyloxyphenylacetate are treated with a solution of 5 g. of sodium in 150 cc. of methanol, mixed with a solution of 7 g. of hydroxylamine hydrochloride in 100 cc. of methanol. One refluxes for 1 hour. After acidification with 20% hydrochloric acid, 26 g. of p-phenylethyloxyphenylacetohydroxamic acid are obtained with yield of 62% (M.P.: 154°–156°).

Following the same procedure as in the foregoing examples, the following acids were also prepared:

p-isobutyloxyphenylacetohydroxamic acid—M.P.: 167–168° C.
p-n-amyloxyphenylacetohydroxamic acid—M.P.: 159–160° C.
p-isoamyloxyphenylacetohydroxamic acid—M.P.: 148–150° C.
p-sec-butyloxyphenylacetohydroxamic acid—M.P.: 86.5–88.5° C.
p-isopropyloxyphenylacetohydroxamic acid—M.P.: 117–119° C.
p-n-propyloxyphenylacetohydroxamic acid—M.P.: 158–160° C.
p-cyclopentylethyloxyphenylacetohydroxamic acid
p-cyclohexylethyloxyphenylacetohydroxamic acid
p-cyclohexyloxyphenylacetohydroxamic acid—M.P.: 111–113° C.
p-2(ethyl)-butyloxyphenylacetohydroxamic acid
p-n-octyloxyphenylacetohydroxamic acid—M.P.: 150–152° C.
p-n-hexyloxyphenylacetohydroxamic acid—M.P.: 156–157° C.
p-hydrocinnamyloxyphenylacetohydroxamic acid—M.P.: 160–162° C.

p-allyloxyphenylacetohydroxamic acid—M.P.: 148–150° C.
p-n-butyloxy-m-isopropyl-ortho-methylphenylacetohydroxamic acid—M.P.: 127–128° C.
p-n-butyloxy-m-methyl-o-methylphenylacetohydroxamic acid—M.P.: 178–180° C.

EXAMPLE 5 p-n-Butyloxy-m-methylphenylacetohydroxamic acid 23.1 g. of hydroxylamine hydrochloride in 330 cc. of methanol are mixed with a solution of 15.5 g. of sodium in 495 cc. of methanol. To the filtered solution, 83 g. of ethyl p-n-butyloxy-m-methylphenylacetate are dropwise added while stirring. Stirring is continued for 1 hour. The mixture is poured on ice, then acidified with 20% HCl. 52 g. of p-n-butyloxy-m-methylphenylacetohydroxamic acid are finally isolated after treatment with petroleum ether. Yield: 65% (M.P.: 110°–111° C.).

EXAMPLE 6 p-Isobutyloxy-m-methylphenylacetohydroxamic acid

One proceeds as in Example 5, by replacing butyl bromide with isobutyl bromide.

Finally, 48 g. of p-isobutyloxy-m-methylphenylacetohydroxamic acid are isolated from 70 g. of ethyl p-isobutyloxy-m-methylphenylacetate ester. Yield: 72% (M.P.: 117.5°–118.5° C.).

By the same method, the p-isobutyloxy-m-isopropyl-o-methylphenylacetohydroxamic acid and the p-isobutyloxy-m,o-dimethylphenylacetohydroxamic acid are obtained.

EXAMPLE 7

3-methyl-4-propoxyphenylacetohydroxamic acid 5 g. of sodium dissolved in 150 ml. of methanol are mixed with a solution of 7 g. of hydroxylamine hydrochloride in 100 ml. of methanol. To the filtered solution, 23.6 g. of ethyl 3-methyl-4-propoxyphenylacetate are added and the mixture is refluxed for 30 minutes. After cooling, 1 volume of water is added and one acidifies with 20% HCl. The 3-methyl-4-propoxyphenylacetohydroxamic acid so precipitated is filtered, washed with water, dried and recrystallized from dichloroethane. Melting point: 117–119° C.

By the same way, the following acids were prepared:

3-methyl-4-isopropyloxyphenylacetohydroxamic acid—M.P.: 107–108° C.
3-methyl-4-amyloxyphenylacetohydroxamic acid—M.P.: 107–110° C.
3-methyl-4-benzyloxyphenylacetohydroxamic acid—M.P.: 127–130° C.

EXAMPLE 8

3-methyl-4-allyloxyphenylacetohydroxamic acid 3.5 g. of hydroxylamine hydrochloride in 50 cc. of methanol are mixed with a solution of 2.5 g. of sodium in 75 cc. of methanol. To the filtered solution, 10.8 g. of methyl 3-methyl-4-allyloxyphenylacetate are added. The solution is stirred overnight at room temperature, then diluted with water and acidified with 20% HCl. The precipitate of 3-methyl-4-allyloxyphenylacetohydroxamic acid is washed with water and then recrystallized from aqueous acetone. The yield is 8.12 g. of acid having a melting point of 128.5–130° C.

By the same procedure, the following additional compounds were prepared:

3-methyl-4-crotyloxyphenylacetohydroxamic acid—M.P.: 120.5–121.5° C.
3-methyl-4-methallyloxyphenylacetohydroxamic acid—M.P.: 122–123° C.
3-methyl-4-cinnomoyloxyphenylacetohydroxamic acid—M.P.: 151–152° C.

EXAMPLE 9

3-ethyl-4-propoxyphenylacetohydroxamic acid

A solution of 5 g. of sodium in 150 ml. of methanol is added to 7 g. of hydroxylamine hydrochloride dissolved in 100 ml. of methanol. The salt is filtered and 21.4 g. of methyl 3-ethyl-4-propoxyphenylacetate are added to the reaction mixture which is refluxed for 30 minutes. After cooling, 1 volume of water is added and one acidifies with 20% HCl. The 3-ethyl-4-propoxyphenylacetohydroxamic acid is filtered, washed with water, dried and recrystallized from isopropanol. This acid has a melting point of 88°–90° C.

In the same way, the following acids were prepared:

3 - ethyl-4-butyloxyphenylacetohydroxamic acid—M.P.: 79°–81° C.
3 - ethyl-4-amyloxyphenylacetohydroxamic acid—M.P.: 79°–81° C.

EXAMPLE 10

3,5-dimethyl-4-butyloxyphenylacetohydroxamic acid

To a solution of 7 g. of hydroxylamine hydrochloride in 150 ml. of methanol, a solution of 5 g. of sodium in 100 ml. of methanol is added, then the salt is filtered and 25 g. of methyl 3,5-dimethyl-4-butoxyphenylacetate are added to the filtrate which is refluxed for 30 minutes. After cooling, 1 volume of water is added and the mixture is acidified with 20% HCl. The 3,5-dimethyl-4-butyloxyphenylacetohydroxamic acid is filtered, washed with water, dried and recrystallized from ethyl acetate. The melting point of the product is: 137°–140° C.

By the same procedure 3,5-dimethyl-4-allyloxyphenylacetohydroxamic acid, melting point 149–151° C. can be prepared.

EXAMPLE 11

3-ethoxy-4-butyloxyphenylacetohydroxamic acid

A solution of 5 g. of sodium in 150 ml. of methanol and a solution of 7 g. of hydroxylamine hydrochloride are mixed and filtered. 26.5 g. of methyl 3-ethoxy-4-butoxyphenylacetate are added and the mixture is refluxed for 30 minutes. One volume of water is added and the mixture is acidified with 20% HCl. The 3-ethoxy-4-butyloxyphenylacetohydroxamic acid is filtered, washed with water, dried and recrystallized from isopropanol, melting point: 92–94° C.

The following compounds were synthesized by the same method:

3 - ethoxy-4-amyloxyphenylacetohydroxamic acid—M.P.: 81°–83° C.
3-ethoxy - 4 - isoamyloxyphenylacetohydroxamic acid— M.P.: 85–86° C.
3 - ethoxy-4-allyloxyphenylacetohydroxamic acid—M.P.: 90–92° C.
3-ethoxy-4-crotyloxyphenylacetohydroxamic acid—M.P.: 108–110.5° C.
3-ethoxy-4-cinnomoyloxyphenylacetohydroxamic acid— M.P.: 149–151° C.

EXAMPLE 12

3-methoxy-4-propoxyphenylacetohydroxamic acid

To a solution of 3.3 g. of hydroxylamine hydrochloride in 45 cc. of methanol, a solution of 2.3 g. of sodium in 60 cc. of methanol is added. To the filtered solution, 11 g. of methyl 3 - methoxy-4-propoxyphenylacetate are added, then the mixture is stirred overnight at room temperature, diluted with water and acidified with 20% HCl. The precipitate is washed with water and recrystallized from benzene, yielding 4.5 g. of the acid, melting point: 127–128° C.

3 - methoxy-4-butyloxyphenylacetohydroxamic acid— M.P.: 121°–122° C. is prepared in the same manner.

EXAMPLE 13

4-amylthiophenylacetohydroxamic acid 7 g. of hydroxylamine hydrochloride dissolved in 100 ml. of methanol are mixed with a solution of 5 g. of sodium in 150 ml. of methanol. After removing the salt precipitate by filtration, 26.7 g. of ethyl 4-amylthiophenylacetate are added to the filtrate and the mixture is refluxed for 30 minutes. One volume of water is added and the mixture is acidified with 20% HCl. The 4-amylthiophenylacetohydroxamic acid product is filtered and washed with water. After being dried and recrystallized from ethyl acetate, the acid has a melting point of 136°–138° C.

The following acids are prepared by the same method:

4-propylthiophenylacetohydroxamic acid—M.P.: 148°–149° C.

4-isopropylthiophenylacetohydroxamic acid—M.P.: 144–145° C.

4-isobutylthiophenylacetohydroxamic acid—M.P.: 144–145° C.

4 - butylthiophenylacetohydroxamic acid—M.P.: 132–135° C.

is stirred overnight at room temperature, diluted with water and acidified with 20% HCl. The precipitate is filtered, washed with water and recrystallized from aqueous acetone. The thus-produced acetohydroxamic acid had a melting point of 126–128° C.

The acids according to the invention have low toxicity and are of value as pharmaceuticals, particularly as anti-inflammatory, analgesic, antipyretic and antispasmodic agents.

These properties of the novel acids according to the invention are set forth in the following tables:

TABLE 1

$LD_{50}$ and antispasmodic action

The results given for the antispasmodic action relate to mgr. per 60–70 ml. of bath necessary to obtain a total inhibition of spasms on quinea pig ileum, said spasms being caused by histamine, acetylcholine and $BaCl_2$ in accordance with conventional techniques.

The $LD_{50}$ values are given in mg./kg. of body weight on mice, the administration being made per os.

For anti-spasmodic activity, data are also given for papaverine as control.

| Acids (substituents) | | $LD_{50}$, mg./kg. | Antispasmodic Action | | |
|---|---|---|---|---|---|
| R | $R'_n$ | | Histamine | Acetyl choline | $BaCl_2$ |
| 4-n-butyloxy | H | >8,000 | 1,000 | 1,000 | 1,000 |
| 4-n-amyloxy | H | >4,000 | 1,000 | >1,000 | |
| 4-sec-butyloxy | H | 1,900 | 1,000 | >1,000 | |
| 4-n-butyloxy | 3-methyl | 1,800 | 500 | 1,000 | 1,000 |
| 4-n-propyloxy | H | 2,900 | 250 | 1,000 | >1,000 |
| 4-allyloxy | H | 4,000 | >1,000 | >1,000 | >1,000 |
| Do | 3-methyl | 3,250 | >1,000 | >1,000 | |
| 4-propyloxy | do | 1,700 | 1,000 | >1,000 | >1,000 |
| 4-isopropyloxy | do | 1,380 | >1,000 | >1,000 | 1,000 |
| 4-n-amyloxy | do | 2,025 | 500 | 1,000 | 1,000 |
| 4-benzyloxy | do | 2,700 | >1,000 | >1,000 | >1,000 |
| 4-n-butyloxy | 3-ethyl | 1,200 | 100 | 100 | >1,000 |
| 4-n-amyloxy | do | 1,780 | 100 | 100 | 200 |
| 4-n-butyloxy | 3-ethoxy | 1,400 | 1,000 | 1,000 | >1,000 |
| 4-n-amyloxy | do | 1,770 | >1,000 | >1,000 | >1,000 |
| 4-isoamyloxy | do | 2,100 | >1,000 | >1,000 | >1,000 |
| 4-n-butyloxy | 3-methoxy | 1,700 | >1,000 | >1,000 | >1,000 |
| 4-n-amylthio | H | 2,800 | 500 | 1,000 | 500 |
| 4-n-propylthio | H | 4,000 | 1,000 | >1,000 | 500 |
| 4-isopropylthio | H | 4,000 | >1,000 | >1,000 | >1,000 |
| 4-n-butylthio | H | 4,000 | 1,000 | 1,000 | |
| 4-isopropylthio | 3-methyl | 2,420 | 1,000 | >1,000 | 1,000 |
| 4-n-butylthio | do | 1,810 | 625 | 125 | 1,000 |
| 4-isobutylthio | do | 3,250 | 625 | 1,000 | 250 |
| 4-n-butyloxy | 3.5-d methyl | >1,000 | >1,000 | | |
| Papaverine | | | 750 | 1,000 | 500 |

EXAMPLE 14

3-methyl-4-propylthiophenylacetohydroxamic acid 7 g. of hydroxylamine hydrochloride dissolved in 100 ml. of methanol are mixed with 5 g. of sodium dissolved in 150 ml. of methanol. The salt is filtered out and 25.2 g. of ethyl 3-methyl-4-propylthiophenylacetate are added to the filtrate which is refluxed for 30 minutes. One volume is added and the 3-methyl-4-propylthiophenylacetohydroxamic acid is filtered, washed with water, dried and recrystallized from isopropanol, melting point: 103–105° C.

The following acids were also prepared in the same manner:

3 - methyl-4-isopropylthiophenylacetohydroxamic acid—M.P.: 120–122° C.

3-methyl-4-butylthiophenylacetohydroxamic acid—M.P.: 106–107° C.

3-methyl - 4 - isobutylthiophenylacetohydroxamic acid—M.P.: 115–116° C.

EXAMPLE 15

P-Δ 2-cyclohexenyloxyphenylacetohydroxamic acid

A solution of 2.5 g. of sodium in methanol is mixed with 3.5 g. of hydroxylamine hydrochloride in 50 cc. of methanol. To the filtered solution, 12.5 g. of ethyl p-Δ 2-cyclohexenyloxyphenylacetate are added. The mixture As it may be seen from Table 1, the antispasmodic activity of most caids according to the invention favorably compare with the activity of papaverine and for many of said acids, the antispasmodic activity is at least equal but generally higher than that of papaverine.

TABLE 2

The following data relating to analgesic activity were obtained by the so-called Blake method [Med. exp. 9:146 (1963); L. Blake, M. L. Graeme and E. B. Sigg].

The test was made on mice and the results for $SD_{50}$ are given in mg./kg.; for comparison, the values similarly obtained for known products are included. The values between parentheses are the confidence limits.

| Acids (substituents) | | Analgesy on mice, Blake mbthed mg./kg. |
|---|---|---|
| R | $R'_n$ | |
| 4-isobutyloxy | H | 114(71.25–182.4) |
| 4-cyclohexyloxy | H | 72(43–118) |
| 4-n-propyloxy | H | 26(16–41) |
| 4-phenylethyloxy | H | 141(80–245) |
| p-cyclohexyl | H | 115(60–218) |
| Aspirin | | 161(88–291) |
| Phenacetine | | 103(75–141) |

TABLE 3

This table also presents data relating to analgesic activity for addition acids based upon other standard procedures.

The method of Siegmund gives the results for $SD_{50}$ in mg./kg., the values between parentheses giving the 95% confidence limits [see E. Siegmund, R. Cadmier and G. Lu Proc. Soc. exp. Biol., N.Y., 95:729 (1957)].

The Randall and Selitto method relates to the sensibility threshold to the pressure, expressed in g. The values given in g. correspond to the maximum threshold increase, the value between parentheses giving the dose administrated in mg./kg. [see L. O. Randall and J. J. Selitto—Arch. int. Pharmacodyn. 111, 409 (1957)].

Similar data for known products are included for comparison.

These data show that the acids of the invention have significant value as therapeutic agents.

| Acids (substituents) | | Analgesic Activity | |
|---|---|---|---|
| R | R'$_n$ | Siegmund | Randall and Selitto |
| 4-n-butyloxy | H | 160 | 197(400) |
| Do | 3-methyl | 321(178-576) | 264(400) |
| 4-allyloxy | H | | 287(400) |
| 4-n-butyl | H | >300 | |
| 4-crotyloxy | 3-methyl | >400 | |
| 4-methallyloxy | do | 400 | |
| 4-propyloxy | do | 231(158-336) | 409(400) |
| 4-isopropyloxy | do | 141(90-217) | 322(400) |
| 4-n-butyloxy | 3-ethyl | >400 | |
| Do | 3-ethoxy | | 182(400) |
| Do | 3-methoxy | >400 | 225(400) |
| 4-isobutylthio | 3-methyl | >400 | |
| Aspirin | | 75(46.8-120) | 125(100) |
| Phenacetine | | 94(63-141) | 53(400) |
| Propoxyphene | | 30.5(21.5-43.3) | 311(80) |
| Codeine | | 17(11.3-25.5) | |
| Aminopyrin | | 110(71-171) | 83(400) |

TABLE 4

This table relates to anti-inflammatory activity of acids according to the invention.

The Benitz and Hall method relates to the weight reduction of carragheenin-induced abscess [see K. F. Benitz and L. M. Hall—Arch. int. Pharmacodyn. 144:1–2, 185 (1963)].

The data given are as potency ratio with respect to phenylbutazone considered as having a potency of 1.

Data are also given as potency ratio with respect to phenylbutazone, said data having been obtained by the well-known cotton pellets-induced granuloma test.

| Acids (substituents) | | Anti-Inflammatory Activity | |
|---|---|---|---|
| R | R'$_n$ | Abscess | Granuloma |
| 4-n-butyloxy | H | 0.5 | 0.3 |
| 4-isobutyloxy | H | 0.5 | 0.3 |
| 4-n-amyloxy | H | 0.5 | 0.3 |
| 4-n-propyloxy | H | 0.5 | |
| 4-allyloxy | H | 0.5 | 0.3 |
| 4-phenylethyloxy | H | 0.5 | |
| 4-n-butyl | H | 0.25 | |
| 4-cyclohexyl | H | 0.25 | |
| 4-allyloxy | 3-methyl | 0.25 | |
| 4-crotyloxy | do | 0.5 | 0.3 |
| 4-propyloxy | do | 0.25 | 0.1 |
| 4-isopropyloxy | do | 0.5 | 0.3 |
| 4-n-butyloxy | do | 0.5 | 0.3 |
| Do | 3-ethyl | 0.5 | 0.3 |
| 4-n-amyloxy | do | 0.25 | 0.3 |
| 4-allyloxy | 3-5-dimethyl | 0.5 | |
| 4-n-butyloxy | 3-ethoxy | 0.5 | |
| 4-n-amyloxy | do | 0.5 | |
| 4-n-butyloxy | 3-methoxy | 1.2 | 0.3 |
| 4-isopropylthio | H | 0.25 | |
| Do | 3-methyl | 0.25 | 0.15 |
| Phenylbutazone | | 1 | 1 |
| Aspirin | | 0.08 | 0.08 |

As indicated by these tests, the acids of the invention show interesting pharmacological properties.

TABLE 5

This compares some acids of the invention with aspirin with respect to antipyretic activity. The values are given as a potency ratio, aspirin being considered as having an antipyretic activity value of 1.

| Acids (substituents) | | Antipyretic activity |
|---|---|---|
| R | R'$_n$ | |
| 4-n-butyloxy | H | 1-1.5 |
| 4-isobutyloxy | H | 1 |
| 4-n-butyloxy | 3-methyl | 0.8 |
| 4-allyloxy | H | 2.5 |
| 4-n-butyolxy | 3-methoxy | 1.5 |
| Aspirin | | 1 |

From the above results given by the tables, it appears that these novel substituted arylacetohydroxamic acids have an interesting combination of antipyretic, anti-inflammatory, anti-spasmodic and analgesic activities, which favorable activities are not found simultaneously in the control products.

Other activities resulting from the preceding ones were found, particularly antihistaminic, antiserotonic corticostimulating, hypocholesterolemic activities and the like.

Said acids, accordingly, are indicated in conditions where such activities are necessary, for example in rehumatoid therapeutics.

The administration of said acids preferably are orally as pills with an enteric coating or as rectal suppositories.

The oral compositions may be in a tablet form containing 250 mg of the active acid with carriers, such as silicium oxide, starch, polyethylene glycol, cellulose acetophthalate, diethylene glycol, propylene glycol and the like, coloring agents, such as titanium dioxide may be included if desired.

The suppositories are dosed at 100, 250, 500 and 1000 mg. of active acid and are made by usual methods.

What is claimed is:

1. Substituted arylacetohydroxamic acids of the formula:

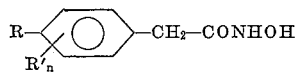

wherein: R and R' represent an alkyl $C_1$–$C_8$, cycloalkyl $C_5$–$C_6$, alkyloxy $C_1$–$C_8$, alkenyloxy $C_2$–$C_8$, cycloalkenyloxy $C_5$–$C_6$, alkylthio $C_1$–$C_8$, cycloalkyloxy $C_5$–$C_6$, cycloalkylalkyloxy (with cycloalkyl $C_5$–$C_6$ and alkyl $C_1$–$C_8$), or arylalkyloxy $C_1$–$C_8$ radical, R and R' can be the same or different, R' can also be hydrogen, and $n$ has a value of 0 to 2.

2. The acid according to claim 1 wherein R is n-butyloxy and R' is hydrogen.

3. The acid according to claim 1 wherein R is butyloxy and R' is methoxy in the 3-position.

4. The acid according to claim 1 wherein R is butyloxy and R' is methyl in the 3-position.

5. The acid according to claim 1 wherein R is allyloxy and R' is hydrogen.

References Cited

UNITED STATES PATENTS

| | | | |
|---|---|---|---|
| 2,279,560 | 4/1942 | Dietrich. | |
| 2,279,973 | 4/1942 | Dietrich. | |
| 2,397,508 | 4/1946 | Rouault et al. | |
| 2,456,785 | 12/1948 | King | 260—559 |
| 2,489,348 | 11/1949 | Wenner | 260—520 |
| 2,501,896 | 3/1950 | Graenacher et al. | 260—592 |
| 3,189,432 | 6/1965 | Richter | 260—473 |
| 3,268,582 | 8/1966 | Zeile et al. | 260—559 |
| 3,383,407 | 5/1968 | Nordmann et al. | |

(Other references on following page)

OTHER REFERENCES

Mathis, "Compt. Read," 232 (1951), pp. 505–7.
Brewster, "Organic Chemistry" (1948), pp. 596–7.
Corse et al., "J. Am. Chem. Soc.," vol. 70 (1948), pp. 2837–43.
Ott et al., "J. Am. Chem. Soc.," vol. 68 (1946), pp. 2633–4.
King et al., "J. Am. Chem. Soc.," vol. 68, (1946), pp. 2335–9.
Schwenk et al., "J. Am. Chem. Soc.," vol 64 (1942), pp. 3051–2.

BERNARD HEFLIN, Primary Examiner
J. E. EVANS, Assistant Examiner

U.S. Cl. X.R.

260—465, 469, 470, 473, 476, 558, 559, 592, 612, 999